United States Patent [19]

Yokota et al.

[11] Patent Number: 4,861,004
[45] Date of Patent: Aug. 29, 1989

[54] FLUID DAMPED ELASTOMERIC BUSHING

[75] Inventors: Motoyuki Yokota; Mamoru Tanabe, both of Okayama; Tatsuo Fujiki, Kurashiki, all of Japan

[73] Assignee: Marugo Rubber Industries, Ltd., Okayama, Japan

[21] Appl. No.: 210,016

[22] Filed: Jun. 22, 1988

[30] Foreign Application Priority Data

Oct. 27, 1987 [JP] Japan .......................... 62-165197[U]

[51] Int. Cl.⁴ ............................................... F16F 1/48
[52] U.S. Cl. ................. 267/140.1; 267/141.2; 267/35; 267/293
[58] Field of Search ............... 267/140.1, 35, 121, 267/141, 219, 141.2, 293; 248/659, 638, 562, 636

[56] References Cited

U.S. PATENT DOCUMENTS

| | | | |
|---|---|---|---|
| 3,698,703 | 10/1972 | Hipsher | 267/140.1 |
| 4,705,410 | 11/1987 | von Broock | 267/140.1 |
| 4,746,104 | 5/1988 | Probst | 267/140.1 |
| 4,749,173 | 6/1988 | Kanda | 267/140.1 |
| 4,771,990 | 9/1988 | Domer et al. | 267/140.1 |

FOREIGN PATENT DOCUMENTS

| | | | |
|---|---|---|---|
| 0213324 | 3/1987 | European Pat. Off. | 267/140.1 |
| 58-21131 | 4/1983 | Japan . | |
| 58-170935 | 10/1983 | Japan . | |
| 60-52337 | 11/1985 | Japan . | |
| 61-31736 | 2/1986 | Japan . | |

*Primary Examiner*—Andres Kashnikow
*Assistant Examiner*—Mark T. Le
*Attorney, Agent, or Firm*—Wenderoth, Lind & Ponack

[57] ABSTRACT

A fluid-damped elastomeric bushing of the invention comprises an inner sleeve and an outer sleeve in a concentric or eccentric relation, an elastic member provided between the inner and outer sleeve, a plurality of liquid chambers or compartments provided in the central portion of the elastic member with respect to the axial direction of the sleeve, the liquid compartments being arranged along the circumference at specified intervals, and orifices to communicate at least the adjacent liquid compartments with each other. The elastic compartment wall of the elastic member has a portion bent toward the interior of the liquid compartment. A central part of the elastic compartment wall may have its thickness reduced relative to the other part.

13 Claims, 7 Drawing Sheets

FLUID DAMPED ELASTOMERIC BUSHING

BACKGROUND OF THE INVENTION

The present invention relates to a vibration prevention support structure used to minimize the vibration of automotive engines, and more particularly to a fluid-damped elastomeric bushing which is effectively applied to, though not limited to, the engine mount of automobiles.

Various types of fluid-damped engine mounts other than a bushing type have been manufactured as a vibration prevention structure for the engine mount. Among them are an engine mount using a partition plate with an orifice and a diaphragm as disclosed in Unexamined Japanese Patent Publication No. 58-170935(1983), another one using a rubber elastic member with one part made thinner and recessed as disclosed in Japanese Patent Publication No. 60-52337(1985) and still another having two compartments divided by a movable wall with an orifice, the movable wall formed, at least partially, by a bellows as disclosed in Japanese Patent Publication No. 58-21131 (1983).

Since these structures have a liquid chamber, the following disadvantages arises: the engine mount is larger than those consisting of ordinary rubber elastic members and fittings; a cover or cap is required for the protection of the diaphragm and the recess; the engine mount support is extended on both sides to avoid interference by the liquid chamber; and a stopper mechanism is required to prevent a large positional deformation of elements in the event that an excess load is applied. All these in turn result in a further increase in the size of the engine mount which occupies a significantly large proportion of the engine room.

In recent years, a front wheel drive is becoming the mainstream of the drive system and the engine mount used for the front wheel drive is mostly of the bushing type having no liquid therein. The engine mount of the bushing type consists basically of an outer sleeve, an inner sleeve and an elastic member. A large displacement applied to the inner sleeve is restrained by the stopper action produced between the inner and outer sleeves, thus ensuring a high level of safety, which is one of the reasons for its use. However, the bushing type engine mount has its disadvantage that the vibration damping characteristic is not as good as that of the above-mentioned large fluid-damped engine mount.

The fluid-damped engine mount other than the bushing type in the vibration prevention support device has a high performance but is suitable only for expensive cars and is large and costly. The bushing type engine mount for the front wheel drive cars is not satisfactory in performance.

If a fluid-damped bushing which is commonly used for vibration damping for vehicle suspension mechanism is used as a vibration damping element in the engine mount, the problem cannot be solved because this will increase the spring constant, deteriorating the comfortable ride.

Any attempt to reduce the rubber hardness or the thickness of the rubber to lower the spring constant will deteriorate the durability, making the anti-vibration structure impractical as the engine mount.

This invention intends to reduce the size of the conventional fluid-damped engine mount, which occupied a considerably large proportion of the engine room, by the use of the fluid-damped bushing which has been difficult to apply to the engine mount structure. For that purpose, the invention reduces the spring constant of the fluid-damped bushing and at the same time gives it a sufficient durability.

An elastic bushing consisting of an elastic member such as rubber interposed between the outer sleeve and the inner sleeve is known. It is also known that to use such an elastic bushing for supporting a heavy object such as an automotive engine, the inner sleeve is put eccentric to the outer sleeve in the direction reverse to load application so that when applied with load the inner sleeve will assume a specified position (almost center position).

Recently, efforts have been made to develop what is generally called a fluid-damped elastomeric bushing of the above eccentric type, in which fluid chambers are formed in the bushing and communicated with each other through an orifice and in which a fluid is sealed in the chambers to effectively damp the vibrations of low frequency. An example is the Unexamined Japanese Patent Publication No. 61-31736(1986).

It has generally been considered that the fluid-damped elastomeric bushing cannot provide a desired damping characteristic when the spring constant is lowered to increase the anti-vibration performance.

Lowering the spring constant requires making thinner the elastic member walls that form the liquid chambers and this, it was believed, in turn would prevent vibrations from producing a change in the volume of the liquid chamber, failing to produce an expected damping effect.

Thus, it was believed that simply making the chamber walls thinner to lower the spring constant is not enough and that as explained in the preceding example a special provision is required to increase the damping performance.

However, the inventors of this invention have found that the fluid displacement is affected not only by the conditions on the compressing side but also by the behavior of the liquid in the chamber being expanded, and also that as long as the volume of the chamber on the expansion side increases during vibration, since an elastic compartment wall is bent toward the interior of the liquid compartment, the compartment is expanded when the bent wall is unbent and a sufficient liquid suction effect is obtained and there is no problem to the liquid transfer but a sufficient transfer of the liquid is accomplished in a smooth manner even when the chamber wall on the compression side is more or less thin. Thus, an expected damping effect is realized.

SUMMARY OF THE INVENTION

As object of the present invention is to provide a compact anti-vibration support structure using a fluid-damped bushing which has been difficult to apply to such a support structure.

Another object of the invention is to provide an anti-vibration support structure which has a sufficient durability and a low spring constant of the fluid-damped bushing.

A further object of the invention is to provide a fluid-damped elastomeric bushing which produces a sufficient suction effect even when the compartment walls on the compression side are somewhat thin, so that there is no problem as to the liquid displacement.

A still further object of the invention is to provide a movable valve structure used in the fluid-damped elastomeric bushing which has an excellent durability and in which a sufficient fluid displacement can be obtained during high frequency vibrations.

The vibration prevention support structure of the present invention concerns a fluid-damped elastomeric bushing which comprises an inner sleeve and an outer sleeve, an elastic member provided between the inner and outer sleeves, a pair of liquid chambers or compartments provided in the central portion of the elastic member with respect to the axial direction of the sleeves, the liquid compartments being arranged along the circumference at specified intervals, and orifices to communicate the liquid compartments with each other. The inner sleeve is put eccentric in the outer sleeve toward the direction perpendicular to the axis so that when a specified load is applied, the inner sleeve becomes coaxial with the outer sleeve, If necessary or if a load to be applied is rather small, the inner sleeve may be placed concentric.

In the present invention, the elastic compartment wall has a part bent toward the interior of the liquid compartment.

In an embodiment of the invention, the orifice has an aperture formed in the compartment wall and a valve mounted to the aperture. The valve may be movably secured by a holder or a holding device fitted to the aperture.

The elastic member may have a sleeve core metal having windows at positions corresponding to the liquid compartments and adjacent to an outer circumference of the elastic member. The electric member may preferably have a plurality of projections over an entire circumference of a portion where the sleeve core metal is disposed.

In another embodiment of this invention, a part of the elastic compartment wall on the side where the eccentric inner sleeve is placed closer to the outer sleeve has its thickness reduced and a part of the elastic compartment wall on the opposite side where the eccentric inner sleeve is placed further apart from the outer sleeve has its thickness reduced likewise.

In the above structure, it is possible to bend toward the interior of the liquid compartment a part of the elastic compartment wall on the side where the eccentric inner sleeve is placed further apart from the outer sleeve. Further, it is possible to install in the liquid compartment wall a cup-shaped elastic member with a bottom to accommodate an orifice tube in its recessed hole formed in the upper surface.

PREFERRED EMBODIMENTS OF THE INVENTION

Figure 1:
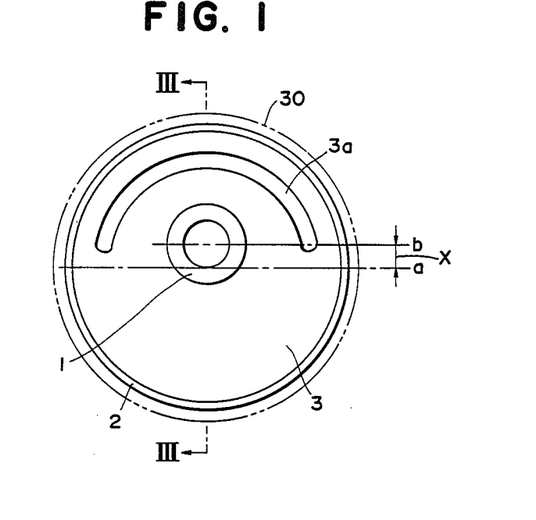
FIG. 1 is a front view of the fluid-damped elastomeric bushing, a first embodiment of the present invention.
Figure 2:
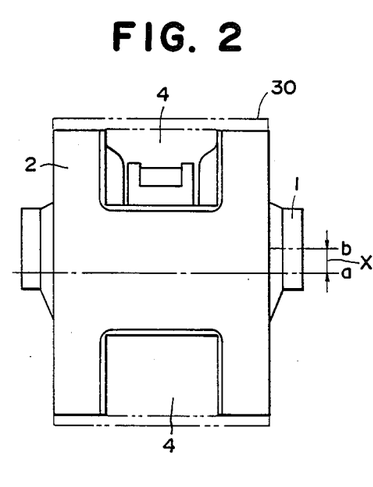
FIG. 2 is a side view of the above fluid-damped elastomeric bushing.
Figure 3:
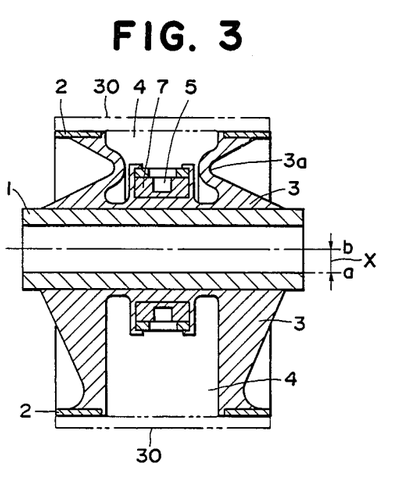
FIG. 3 is a cross-sectional view of the bushing taken along the line III—III of FIG. 1.

In FIGS. 1 through 3, the vibration prevention support structure, that is, the fluid-damped elastomeric bushing has an elastic member 3 provided between an inner sleeve 1 and an outer sleeve 2. A pair of liquid compartments 4 are formed in the elastic member 3 at the central portion thereof with respect to the axial direction and they are arranged along the circumference at specified intervals. The adjacent liquid compartments 4 are communicated with each other through orifices 5 having an orifice cylinder 7.

In the present invention, the side wall portion 3a of the elastic compartment wall 3 located on the side where the inner sleeve 1 is disposed close to the outer sleeve 2 or on the narrow space side (i.e., on the side where the distance between the outer sleeve 2 and the inner sleeve 1 is shorter) is bent toward the interior of the liquid compartment, as illustrated in FIG. 3.

In such an elastomeric bushing structure, the inner sleeve 1 is preferably disposed eccentric with respect to the outer sleeve 2 in a direction perpendicular to the axis so that it will become concentric with the outer sleeve when applied with a load such an engine weight. That is, in FIGS. 1 through 3, the axis a represents the center of this device or of the outer sleeve 2 and the axis b represents the center of the inner sleeve 1, the two axes a and b being set apart by a distance X.

In addition to the eccentricity of the inner sleeve 1, this embodiment of the invention has a thin wall portion 3a formed at a part of the elastic member 3 on the expansion side, i.e., on the upper side of the inner sleeve in FIG. 3 of the drawing. Although the thin wall portion 3a of the example shown is a continuous arc, it may be series of intermittent arcs, not shown. The thin wall portion 3a thus formed can lower the spring constant and at the same time reduce stresses associated with it. When an excess load is applied, the orifice 5 and a cover tube 30, in combination, produce a stopper effect.

The fluid-damped elastomeric bushing of the above embodiment has a sufficient durability as an engine mount and effectively damps the vibrations. When used as an engine mount, the device, which is of the bushing type and is small in size, does not require a large space contributing to reduction in weight and cost of the engine mount. It also improves the comfort of the ride.

Figure 4A:
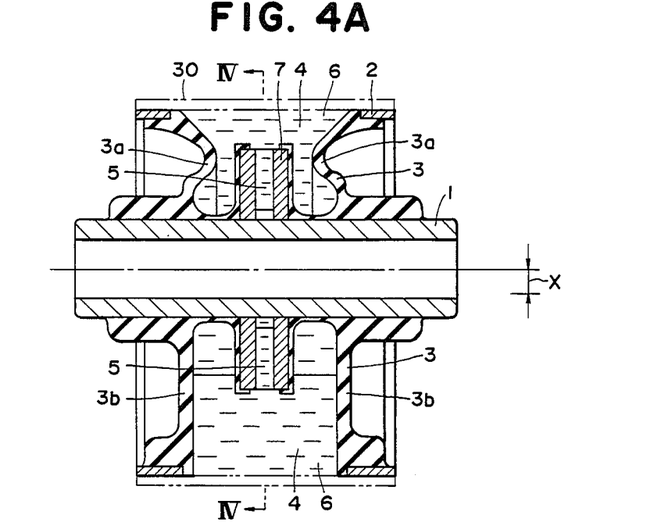
FIGS. 4A and 4B are vertical cross-sectional views or another embodiment of the fluid-damped elastomeric bushing according to the present invention.
Figure 4B:
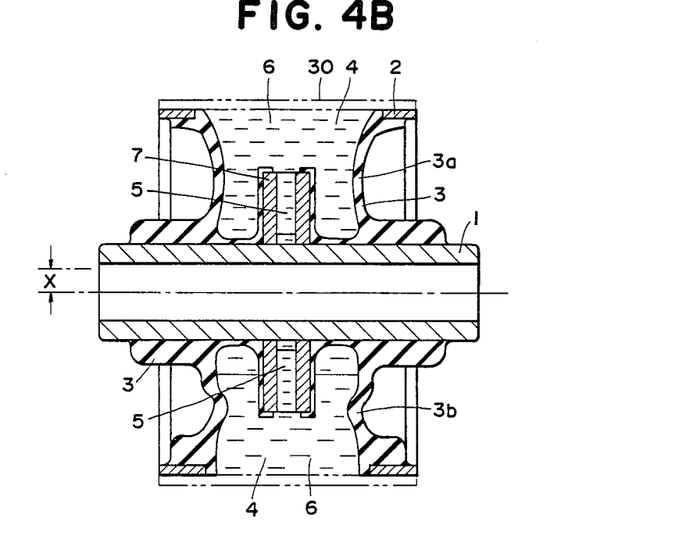
Figure 4C:
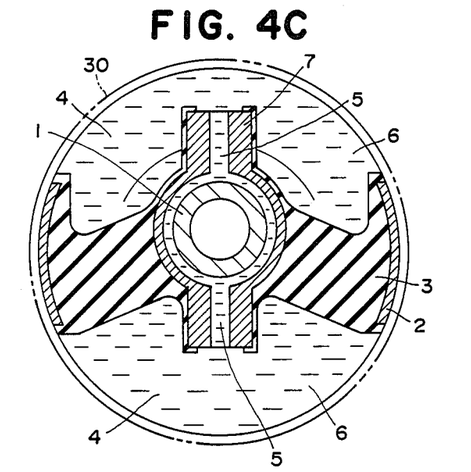
FIG. 4C is a sectional view of the fluid-damped elastomeric damping bushing shown in FIGS. 4A and 4B, taken along line IV—IV in FIG. 4A.

In FIGS. 4A, 4B and 4C showing another embodiment, the side wall portion 3a of the elastic compartment wall 3 located on the side where the inner sleeve 1 is disposed close to the outer sleeve 2 or on the narrow space side (i.e., on the side where the distance between the outer sleeve 2 and the inner sleeve 1 is shorter) is made thinner than other portions and bent toward the interior of the liquid compartment 4. On the side where the inner sleeve 1 is disposed further apart from the outer sleeve 2 or on the wide space side (i.e., on the side where the distance between the outer sleeve 2 and the inner sleeve 1 is longer) the side wall portion 3b of the elastic compartment wall 3 is made thin likewise. FIG. 4B shows inner sleeve 1 to assume the normal position (almost concentric with the outer sleeve 2) as the inner sleeve 1—which is prebiased to take an eccentric position with respect to the outer sleeve 2—is applied with a specified weight. The thickness of the bent portion 3a, 3b of the elastic member 3 is preferably set to be 2 to 10% of the outer diameter of the device, and it is particularly desirable to set the thickness to be 4 to 5% from the standpoint of manufacture, performance, and durability.

The reason that the part 3b of the elastic compartment wall 3 on the wide space side is also made thin in the embodiment of FIGS. 4A and 4B is to reduce the spring constant of this part and thereby realize a soft spring by the bushing as a whole. It is also possible to bend the elastic compartment wall 3b toward the interior of the liquid compartment 4. Other structural features such as the orifice 5 and the eccentric distance X are substantially similar to the structure of the first embodiment of FIGS. 1-3.

In this way, by making thin and bent a part 3a of the elastic compartment wall 3 that forms the liquid compartment 4 in the bushing on the narrow space side, volume change in the liquid compartments 4 both on the expansion side and on the compression side can easily occur when the device is subject to vibrations. This permits an effective pumping action such as suction and discharge, thus making the transfer of fluid 6 more easy. Therefore, the device has an excellent damping characteristic in the low-frequency vibration range. In addition, since a part of the elastic compartment wall 3 is made thin, the spring constant of the bushing as a whole is reduced, so that the device has a good vibration prevention characteristic in the high-frequency vibration range.

A durability comparison test between the bent structure of the present invention and the conventional straight structure for a produced dimension of 65 mm (in diameter)×55 mm (in width) (condition: 7 mm to −1 mm in one radial direction, 200 cpm) showed that the straight structure fractured at 310,000 operations while the bent structure exhibited no abnormal conditions even at 1,000,000 operations. This means that the bent structure has a life more than three times as much.

Figure 5A:
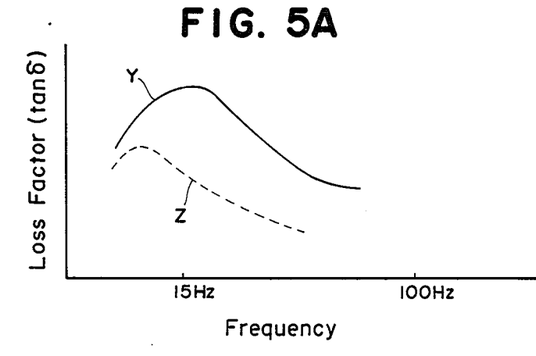
FIGS. 5A and 5B are graphs showing the relation between the loss factor (tan δ) and the frequency in respect of the apparatus of the present invention and the conventional apparatus.
Figure 5B:
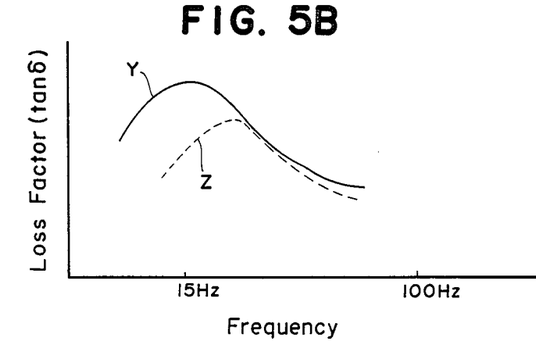

FIGS. 5A and 5B show comparison experiments between an apparatus (Y) of the present invention is which the elastic compartment wall 3a is bent inwardly and a conventional apparatus (Z) having a straightly extending wall. In FIG. 5A, a spring constant of the elastic compartment walls of both the present invention (Y) and the conventional apparatus (Z) is set equal, and in FIG. 5B, a hardness of the elastic compartment walls are set equal, the liquid displacement in the conventional apparatus (Z) is very limited and a peak value of the loss factor thereof is much lower than that of the present invention (Y), resulting in deterioration of damping effect. These differences result from the aforementioned pumping action of the elastic compartment walls.

Figure 6:
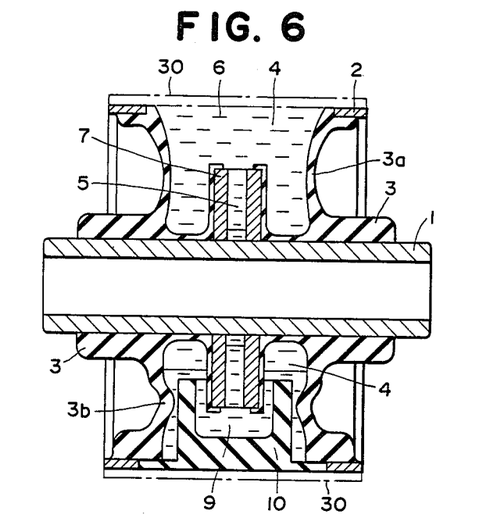
FIG. 6 is a cross-sectional view of a further embodiment of the fluid-damped elastomeric bushing according to the present invention.

FIG. 6 shows a still another embodiment, in which a cup-shaped inner elastic member 10 with a bottom is provided in the liquid compartment 4. The inner elastic member 10 has a recess 9 formed at the top to accommodate an orifice tube 7.

Figure 7A:
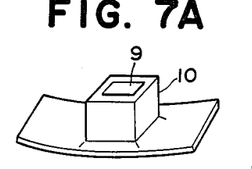
FIGS. 7A and 7B are perspective views of an inner elastic member of FIG. 6 installed in the liquid chamber.
Figure 7B:
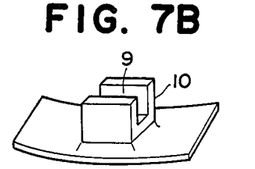

In the embodiment of FIG. 6, when the device is subjected to vibrations and compressed, the gap space between the orifice tube 7 and the recess 9 of the inner elastic member 10 decreases causing the fluid 6 such as a liquid in the space to be discharged outside. Since there is a resistance to the discharging of fluid, the fluid 6 can more easily move to the upper compartment 4 in FIG. 6 through the orifice 5. A second reason is that when the device is displaced to a large extent, the end of the orifice tube 7 abuts against the bottom of the recess 9 and thereby functions as a sort of stopper. At this time, when the elastic compartment wall 3b bends inwardly to abut against the inner elastic member 10, it can be expected also to serve as a stopper. Considering these, it is also possible to install the inner elastic member 10 not only in the fluid compartment 4 on the wide space side (i.e., lower compartment in FIG. 6) but also on the narrow space side (i.e. upper compartment in FIG. 6). Furthermore, the recess 9 can be a hole type (FIG. 7A) or a groove type (FIG. 7B).

Figure 8:
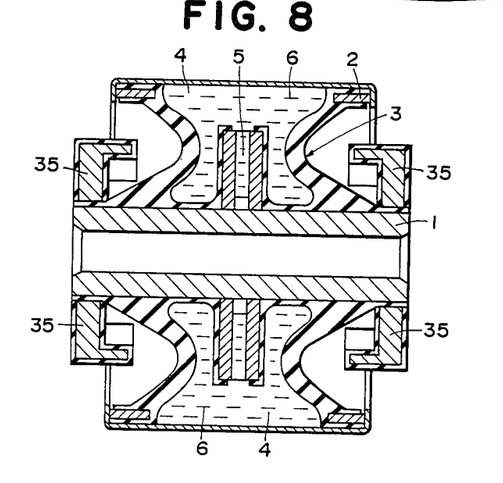
FIG. 8 is a lateral cross-sectional view of another embodiment of the fluid-damped elastomeric bushing according to the present invention.
Figure 9:
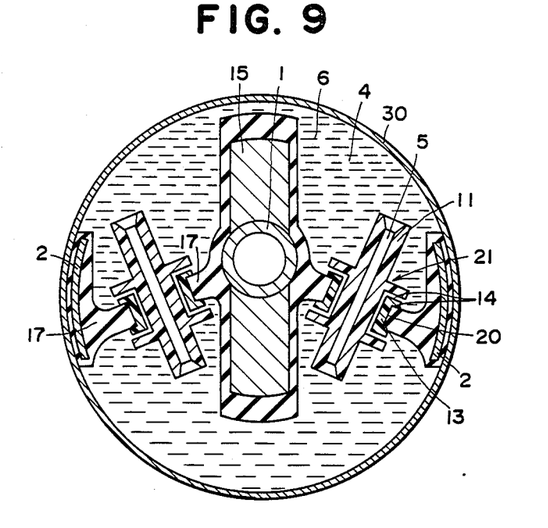
FIG. 9 is a cross-sectional view of still another embodiment of the fluid-damped elastomeric bushing according to the present invention showing a valve and a valve holder.

FIG. 8 shows a modification of the construction of the previous embodiment of FIG. 6. In the embodiment of FIG. 8, stopper members 35 each of which is L-shaped in cross-section are provided outside the liquid compartments 4 and between the outer sleeve 2 and the inner sleeve 1 so as not to reduce the space within the liquid compartments. When an excessive load is applied, a "dual" stopper effect can be realized by the orifice 5 and the cover tube 30 and by the L-shaped stopper 35.

FIGS. 9 through 14 show a further embodiment of the present invention. In this embodiment, two liquid compartments 4 are communicated with each other through a communication mechanism 21. When the device is subjected to vibration, the transfer of fluid 6 takes place through the communication mechanism 21, damping the vibration by the flow resistance. The detail of the communication mechanism 21 is as follows. A partition wall 17 is provided horizontally and parallel to the axis of the inner sleeve 1 and is formed with communication holes 20 at appropriate locations. In the communication holes 20 there are installed movable valves 11 which are H-shaped in a side cross section. The movable valve 11 has an orifice 5 extending therethrough to communicate the two liquid compartments 4 with each other at all times. In this embodiment, the movable valve 11 is not directly inserted in the communication hole 20. The communication hole 20 is first fitted with a movable valve holder 13 which is formed with a relatively hard material such as hard plastics and then the movable valve 11 is installed in the movable valve holder 13. The movable valve holder 13 consists of a body portion 13a that fits over the partition wall edge of the communication hole 20 and a flange portion 13b that extends along each side of the partition wall 17.

In the embodiment of FIG. 9-14, the movable valve 11 is not directly inserted in the communication hole but fitted to a movable valve holder 13 so that the holder 13 along with the movable valve 11 is fitted to the partition wall 17. However, the movable valve 11 can be fitted directly to the partition wall 17, though not illustrated.

The movable valve 11 allows the transfer of fluid 6 between the fluid compartments 4 during the high-frequency and small vibration and restrains it during the low-frequency and relatively small vibration. For that purpose, a valve tube 11a forming the body portion of the H-shaped cross section is installed in an insertion hole 13c formed at the center of the movable valve holder 13 with a reasonably large gap 14. The valve tube 11a has at its ends valve heads 11b which serve as a flange and are larger in diameter and longer than the flange portion 13b of the holder 13. The communication hole 20 and the insertion hole 13c of the movable holder 13 are both oval with their major axes extending along the axis of the inner sleeve 1. The gap 14 (radial gap 14a) between the insertion hole 13c and the valve tube 11a is made especially large in the major axis direction (see FIG. 11). Also, the gap 14 (axis gap 14b) between the valve head 11b of the movable valve 11 and the flange portion 13b of the holder 13 is also made reasonably large. As an example, for an insertion hole 13c with its major axis measuring 22.0 mm and the minor axis 11.0 mm and the valve tube having diameter of 10.0×9.0 mm, the gap may have the radial gap 14a of 6.0 mm on the major axis side and 1.0 mm on the minor axis side and the axial gap 14b of 1.0 to 2.0 mm.

With the above structure, as the movable valve 11 is activated by vibration, its valve head 11b strikes the movable valve holder 13. But what it strikes is the flange portion 13b of the movable valve holder 13 and it does not hit the partition wall 17 directly. So, the durability of the partition wall 17 is not deteriorated. With the gap 14 between the movable valve 11 and the holder 13 set sufficiently large so that the valve is not closed during high-frequency vibration, the following additional functions are obtained.

As an example of an engine mount for cars, a vibration amplitude in the range of a high frequency vibration such as at about 100 Hz is ±0.1 mm. At the time of so-called "car-shake" at a high speed drive, which provides a frequency of about 15-20 Hz and is serious disadvantage for cars, the vibration amplitude lies in the range of about ±0.5 to ±2.0 mm.

First, for high-frequency vibrations with amplitude of ±0.1 mm and frequency of 100 Hz, a change in the fluid pressure in the fluid compartment 4 actuates the movable valve 11 by an amplitude almost equal to that of the high-frequency vibrations. At this time, both the radial gap 14a and the axial gap 14b are left open and do not block the transfer of fluid between the two fluid compartments 4. On top of that, the pumping action and the movement of the movable valve 11 combine to facilitate the fluid transfer. Hence, a rise in the dynamic spring constant is suppressed in a wide high-frequency range and this means that the device (Y) of the present invention has an excellent vibration absorbing characteristic. On the other hand, the dynamic spring constant of the conventional device (Z) rises in a relatively low frequency range (see FIG. 13).

Figure 10:
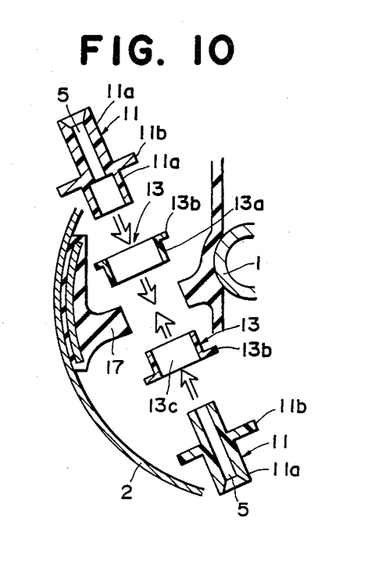
FIG. 10 is a partial cross-sectional view showing the procedure for assembling the valve and the valve holder.
Figure 11:
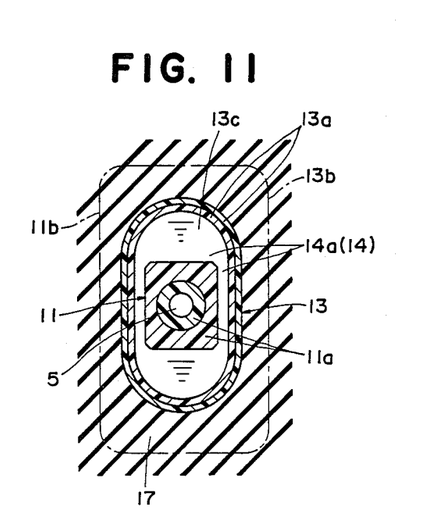
FIG. 11 is an enlarged horizontal cross-sectional view of the valve shown in FIGS. 9 and 10.

Next, for low-frequency vibrations with amplitude of ±0.5 to ±1.0 mm and frequency of 15 Hz, the displacement of the movable valve 11 exceeds the above vibration amplitude. The valve head 11b strikes the flange portion 13b of the holder 13 and closes the axial gap 14b, blocking the transfer of fluid 6 between the fluid compartments 4. In this condition, the fluid 6 can only pass through the orifice 5 in the movable valve 11 and its flow resistance produces a damping effect. This is the same as the conventional device (Z), see FIG. 14. The diameter and length of the orifice 5 should be determined to generate an adequate flow resistance. As to the orifice length in particular, it should be longer than a certain length to produce a necessary fluid flow resistance. One of the methods for this purpose may, as shown in FIG. 10, involve extending the valve body 11a upward and downward from the valve head 11b to make the orifice longer than the valve body 11a.

Figure 12:
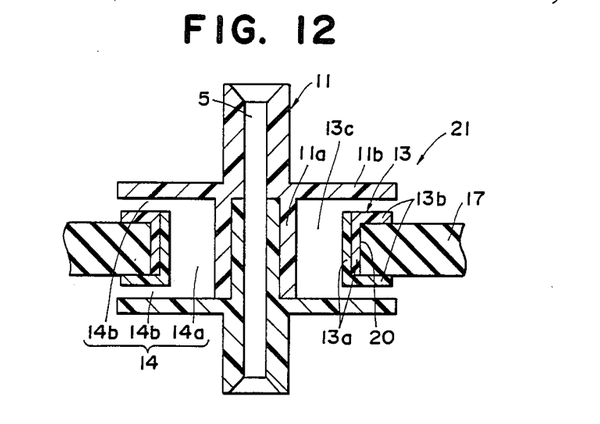
FIG. 12 is an enlarged side cross-sectional view of the valve.
Figure 13:
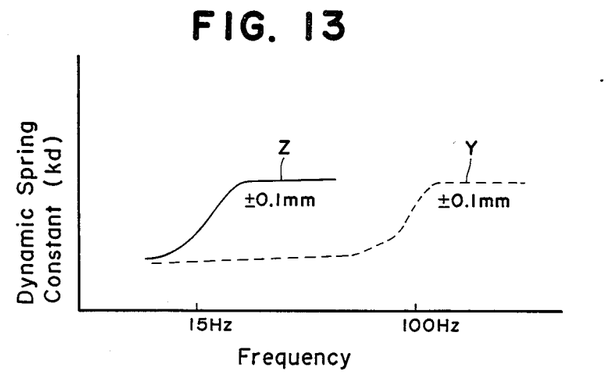
FIGS. 13 and 14 are graphs showing the relation between the dynamic spring constant and the frequency of vibration and between the loss factor (tan δ) and the frequency of vibration, respectively, for the embodiment of FIGS. 9 through 12.
Figure 14:
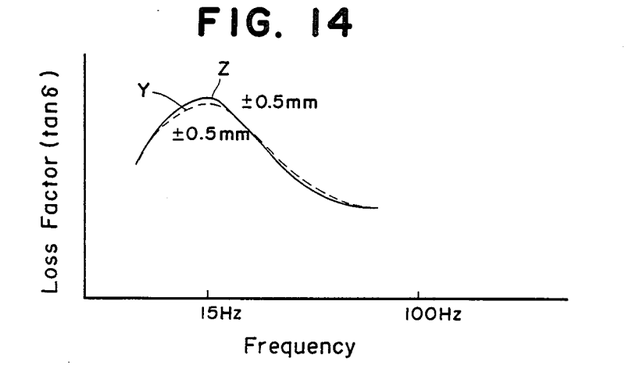
Figure 15:
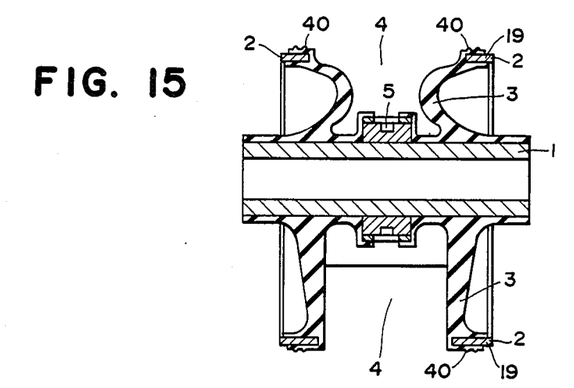
FIG. 15 is a vertical cross-sectional view of a still further embodiment according to the present invention.

Now, the procedure for assembling the movable valve holder 13 and the movable valve 11 into the communication hole 20 will be explained. As shown in FIG. 12, the movable valve holder 13 and the movable valve 11 are both divided into upper and lower halves and the divided halves are attached to the partition wall 17 from above and below and then fused together by ultrasonic waves or bonded. This method allows the assembly of these components even when the flange partition 13b of the movable valve holder 13 and the valve head 11b of the movable valve 11 are large.

When a shock is applied to the supported object and the inner sleeve 1 is displaced excessively, the inner sleeve 1 may strike the outer sleeve 2 with a strong impact, causing damages to them. To prevent this, it is common practice to provide a stopper 15 (FIG. 9) in the fluid compartment 4. In this embodiment with the above structure, it is desirable to form the stopper 15 in the following construction. That is, in the fluid compartment 4, a metallic projection extending in the direction of vibration of the inner sleeve 1 is directly secured, as by welding, to the inner sleeve 1. The end of the metallic projection is covered with an elastic rubber member 3, which is molded continuously from the partition wall 17, to minimize the shock at time of impact. The width of the stopper 15 is made smaller than the diameter of the inner sleeve 1 so as not to reduce the length of the partition wall 17. This allows the partition wall 17 to be set to the maximum possible dimension so that the stress resulting from the repetitive load can be reduced, increasing the life and durability.

The advantages of the above embodiment are as follows. First, since it is through the movable valve holder 13 mounted in the partition wall 17 that the movable valve 11 is installed in the partition wall 17, the partition wall 17 of the elastic rubber member 3 is reinforced and has an increased durability. Also, since the movable valve holder 13 is formed of a relatively hard material, it is possible to improve the flatness and surface roughness of the flange portion 13b. As a result, when the movable valve 11 is displaced and hits the flange portion 13b of the movable valve holder 13, there is no friction between them and they are so close together that no fluid leaks through the valve.

A further advantage is that since, in the mounting structure of the movable valve 11 and the valve holder 13, the axial gap 14b is so determined as to prevent the closure of the valve during high-frequency vibration and the radial gap 14a is also set to a reasonably large value to facilitate the fluid flow during high-frequency vibration, a rise in the dynamic spring constant can be suppressed over a wide high-frequency range. The device therefore has an excellent vibration absorption performance.

FIGS. 15 to 19 show a further embodiment of this invention. In this embodiment, an outer sleeve 2 has a sleeve core metal 19 which is fitted over the elastic rubber member 3 and has windows 19a cut at locations corresponding to the fluid compartments 4 and near the external circumference of the elastic rubber member 3. That part of the elastic rubber member 3 which is on the outer circumference of the sleeve core metal 19 has a plurality of raised strips 40 formed over the entire circumference. The sleeve core member 19 with windows 19a cut at locations corresponding to the fluid compartments 4 is fitted to the elastic rubber member 3 near the outer circumference thereof. For reduced cost of manufacture, the sleeve core metal 19 is formed of a flat plate with a joint structure 19b at each end that can be joined together and then fixed to the elastic rubber member 3. Further, the outermost circumferential part of the elastic rubber member 3 is put over the outer circumference of the sleeve core metal 19 and a plurality of raised strips 40 (two to five strips) are formed on the outermost circumferential part of the elastic rubber member 3 to improve the liquid sealing ability when the cover tube 30 is fitted.

Figures 17, 18, 19:
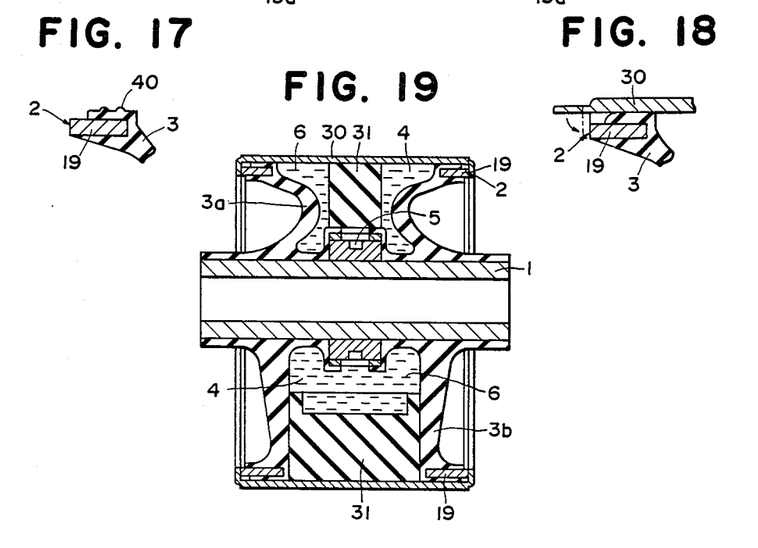
FIG. 17 is an essential enlarged cross-sectional view showing a lip formed around the periphery of the rubber elastic member.
FIG. 18 is an essential enlarged cross-sectional view showing the end of the outer sleeve.
FIG. 19 is a cross-sectional view of yet another embodiment of the fluid-damped elastomeric bushing according to the present invention.

As for the method of forming the elastic bushing, the common method consists in molding the elastic rubber member 3 between the inner sleeve 1 and the outer sleeve 2, immersing the molded inner sleeve 1 and outer sleeve 2 in the liquid 6, and fitting the cover tube 30 to seal the liquid inside the liquid compartments. The ends of the cover tube 30 are bent and caulked to prevent positional deviation between the cover tube 30 and the elastic rubber member 3. The caulking portion of the cover tube may be made thinner (as shown in FIG. 18) to permit easy and reliable caulking.

Figure 16:
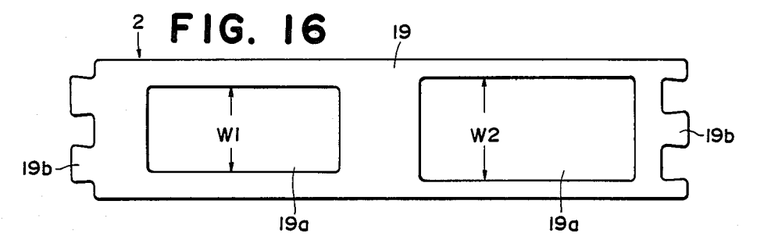
FIG. 16 is a development drawing of a core metal.

The elastic rubber member 3 is formed bent by using a molding pattern. In this process, the window 19a of the sleeve core metal 19 on the side where the elastic rubber member 3 is formed bent has a the width W2 which is larger than the width W1 of the other window 19a where the rubber member is formed straight (as shown in FIG. 16). This insures a necessary strength of the sleeve core metal, permits easy mold removing and allows sharper or larger bends, contributing to a reduction in the spring constant.

With the above structure, it is possible to resiliently support an object (vibrating component) by mounting the cover tube 30 to a stationary member and the inner sleeve 1 to the object to be supported. As shown in FIG. 19, a stopper 31 may be provided in each liquid compartment to restrict an excessive displacement of the inner sleeve 1.

In the foregoing, we have explained the preferred embodiments of this invention It should be noted, however, that the invention is not limited to these embodiments alone and that various modifications may be made without departing from the scope of the claims.

What is claimed is:

1. A fluid-damped elastomeric bushing comprising:
   an inner sleeve and an outer sleeve disposed radially outwardly of said inner sleeve;
   an elastic member interposed between said inner sleeve and said outer sleeve;
   a pair of liquid compartments defined in said elastic member at a central portion thereof relative to an axial direction of said elastic member, said pair of liquid compartments being disposed in spaced opposed relation relative to said inner sleeve, each one of said pair of liquid compartments having spaced opposed elastic side walls in an opposing relation and defining an interior, at least a part of each said side wall being bent inwardly toward the interior of each of said liquid compartments, and an inner elastic member in each one of said pair of liquid compartments, each said inner elastic member having a bottom and a recess for receiving an orifice means therein; and
   orifice means disposed in said recess of each said inner elastic member of said pair of liquid compartments for communicating said pair of liquid compartments for causing a liquid in one of said pair of liquid compartments to be forcibly fed to the outer one of said pair of liquid compartments when a load is supplied to said bushing, and each said orifice means projecting into said recess of each said inner elastic member for facilitating movement of a liquid between said pair of liquid compartments, and each said orifice means being sufficiently long for limiting an over displacement of said inner sleeve relative to said outer sleeve.

2. A fluid-damped elastomeric bushing according to claim 1, wherein said inner sleeve is disposed in a concentric relation relative to said outer sleeve.

3. A fluid-damped elastomeric bushing according to claim 1, wherein said inner sleeve is disposed in an eccentric relation relative to said outer sleeve.

4. A fluid-damped elastomeric bushing according to claim 1, wherein said elastic member has a sleeve core metal having windows at positions corresponding to said liquid compartments and adjacent to an outer circumference of said elastic member.

5. A fluid-damped elastomeric bushing according to claim 1, wherein said elastic member has a plurality of projections over an entire circumference of a portion where said sleeve core metal is disposed.

6. A fluid-damped elastomeric bushing according to claim 1, wherein said orifice means has a ring-like member on an outer portion of said inner sleeve so that said ring-like member is held by a portion of said elastic member.

7. A fluid-damped elastomeric bushing according to claim 1, wherein a stopper is disposed outside said liquid compartments and between said inner sleeve and said outer sleeve.

8. A fluid-damped elastomeric bushing comprising:
   an inner sleeve and an outer sleeve disposed radially outwardly of said inner sleeve;
   an elastic member interposed between said inner sleeve and said outer sleeve;
   a pair of liquid compartments defined in said elastic member at a central portion thereof relative to an axial direction of said elastic member, said pair of liquid compartments being disposed in spaced opposed relation relative to said inner sleeve, each one of said pair of liquid compartments having spaced opposed elastic side walls in an opposing relation and defining an interior, at least a part of each said side wall being bent inwardly toward the interior of each of said liquid compartments; and a communication mechanism for communicating said liquid compartments for causing a liquid in one of said pair of liquid compartments to be forcible fed to the other one of said pair of liquid compartments when a load is applied to said bushing, said communication mechanism including (i) a partition wall, disposed horizontally and parallel to an axis of said inner sleeve, and having a communication hole means; and (ii) movable valve means in said communication hole means, said movable valve means having a movable valve, orifice means for communicating said pair of liquid compartments with each other, and a valve holder having an insertion hole for holding said movable valve within said communication hole means of said partition wall and with a relatively large gap defined between said movable valve and said valve holder, said communication hole means and said insertion hole of said valve holder being both substantially oval with their major axes coextending along an axis of said inner sleeve, said movable valve means causing transfer of a fluid between said pair of liquid compartments through said gap during a high frequency vibration of said bushing, and said movable valve means blocking said gap and causing transfer of a fluid between said pair of liquid compartments through said orifice means during a low-frequency vibration of said bushing.

9. A fluid-damped elastomeric bushing according to claim 8, wherein a stopper is disposed within said liquid compartments for limiting an overdisplacement of said inner sleeve relative to said outer sleeve.

10. A fluid-damped elastomeric bushing according to claim 8, wherein said inner sleeve is disposed in a concentric relation relative to said outer sleeve.

11. A fluid-damped elastomeric bushing according to claim 8, wherein said inner sleeve is disposed in an eccentric relation relative to said outer sleeve.

12. A fluid-damped elastomeric bushing according to claim 8, wherein said elastic member has a sleeve core metal having windows at positions corresponding to said liquid compartments and adjacent to an outer circumference of said elastic member.

13. A fluid-damped elastomeric bushing according to claim 8, wherein a stopper is disposed outside said liquid compartment and between said inner sleeve and said outer sleeve.

* * * * *